（12） United States Patent
Lee et al.

(10) Patent No.: US 12,532,019 B2
(45) Date of Patent: Jan. 20, 2026

(54) METHOD FOR DECODING IMMERSIVE VIDEO AND METHOD FOR ENCODING IMMERSIVE VIDEO

(71) Applicant: Electronics and Telecommunications Research Institute, Daejeon (KR)

(72) Inventors: Gwang Soon Lee, Daejeon (KR); Kwan Jung Oh, Daejeon (KR); Jun Young Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 428 days.

(21) Appl. No.: 18/097,037

(22) Filed: Jan. 13, 2023

(65) Prior Publication Data

US 2023/0232031 A1 Jul. 20, 2023

(30) Foreign Application Priority Data

Jan. 14, 2022 (KR) ........................ 10-2022-0006202
Apr. 19, 2022 (KR) ........................ 10-2022-0048527
Dec. 23, 2022 (KR) ........................ 10-2022-0183562

(51) Int. Cl.
*H04N 19/48* (2014.01)
*H04N 19/136* (2014.01)
*H04N 19/167* (2014.01)
*H04N 19/17* (2014.01)
*H04N 19/70* (2014.01)
*G06V 20/40* (2022.01)

(52) U.S. Cl.
CPC ........... *H04N 19/48* (2014.11); *H04N 19/136* (2014.11); *H04N 19/167* (2014.11); *H04N 19/17* (2014.11); *H04N 19/70* (2014.11); *G06V 20/41* (2022.01)

(58) Field of Classification Search
CPC ................................ H04N 19/48; H04N 19/70
See application file for complete search history.

(56) References Cited

U.S. PATENT DOCUMENTS

| | | | |
|---|---|---|---|
| 2021/0329209 A1 | 10/2021 | Lee et al. | |
| 2021/0383122 A1 | 12/2021 | Jeong et al. | |
| 2023/0042874 A1* | 2/2023 | Dore | H04N 19/597 |

FOREIGN PATENT DOCUMENTS

| | | |
|---|---|---|
| KR | 10-2020-0112737 | 10/2020 |
| KR | 10-2021-0084242 | 7/2021 |

OTHER PUBLICATIONS

"Information technology—Coded representation of immersive media—Part 12: MPEG Immersive video", ISO/IEC 23090-12:2021(E), 2021, 81 total pages.

* cited by examiner

*Primary Examiner* — Jerry T Jean Baptiste
(74) *Attorney, Agent, or Firm* — KILE PARK REED & HOUTTEMAN PLLC

(57) ABSTRACT

A method of processing an immersive video includes classifying each of a plurality of objects included in a view image as one of a first object group and a second object group, acquiring a patch for each of the plurality of objects, and packing patches to generate at least one atlas. In this instance, patches derived from objects belonging to the first object group may be packed in a different region or a different atlas from a region or an atlas of patches derived from objects belonging to the second object group.

18 Claims, 12 Drawing Sheets

【FIG. 1】
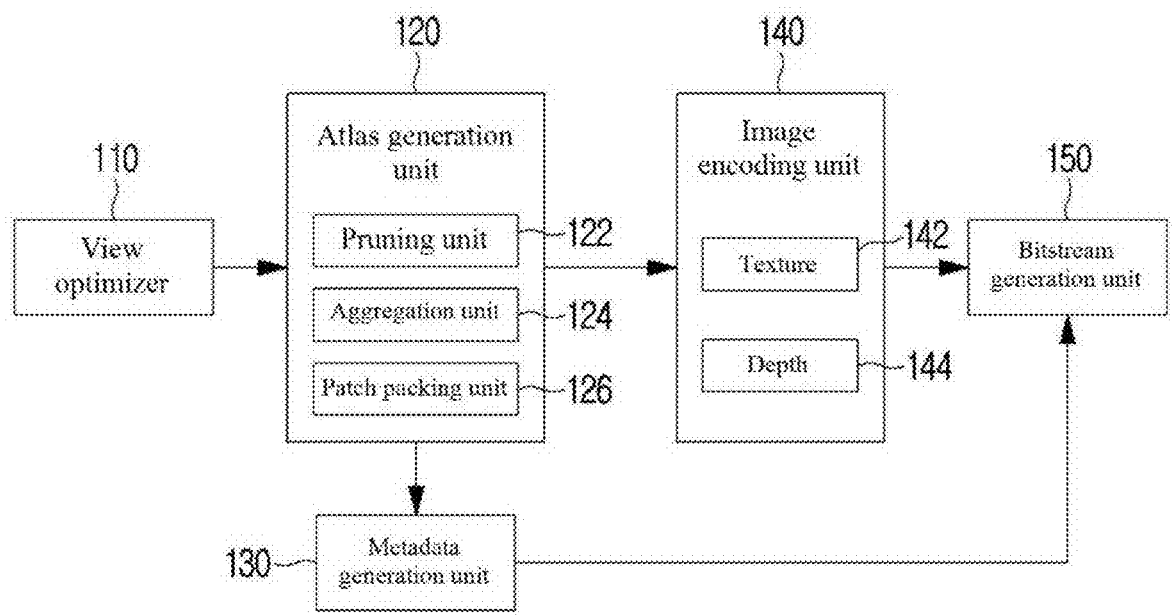
【FIG. 2】
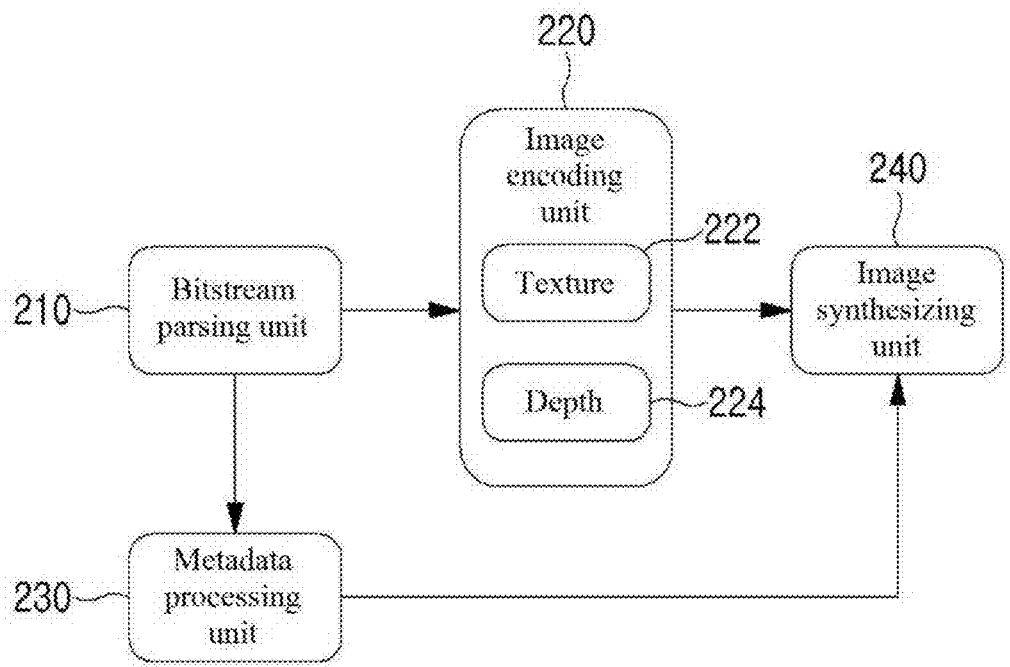

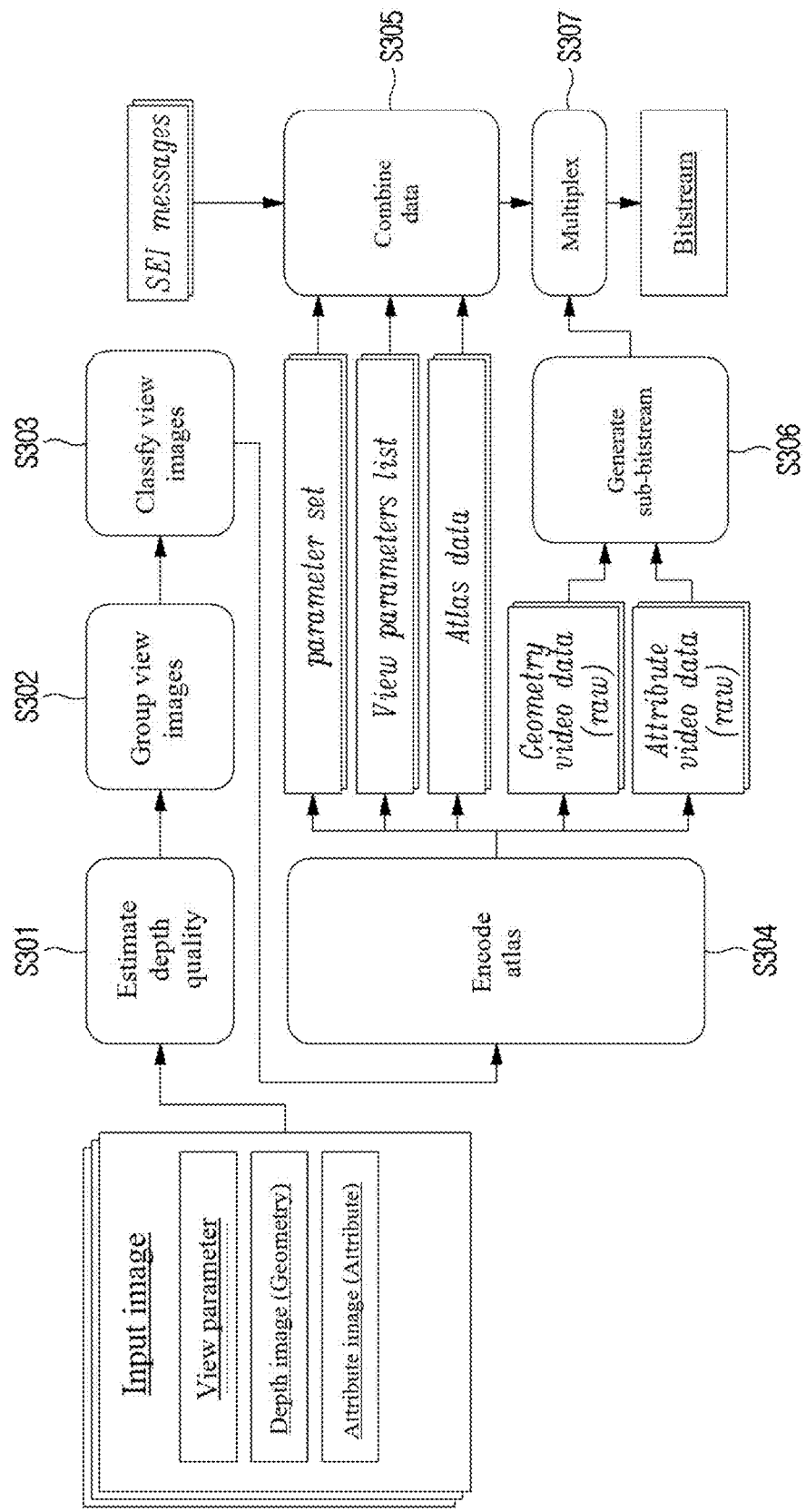

[FIG. 4]
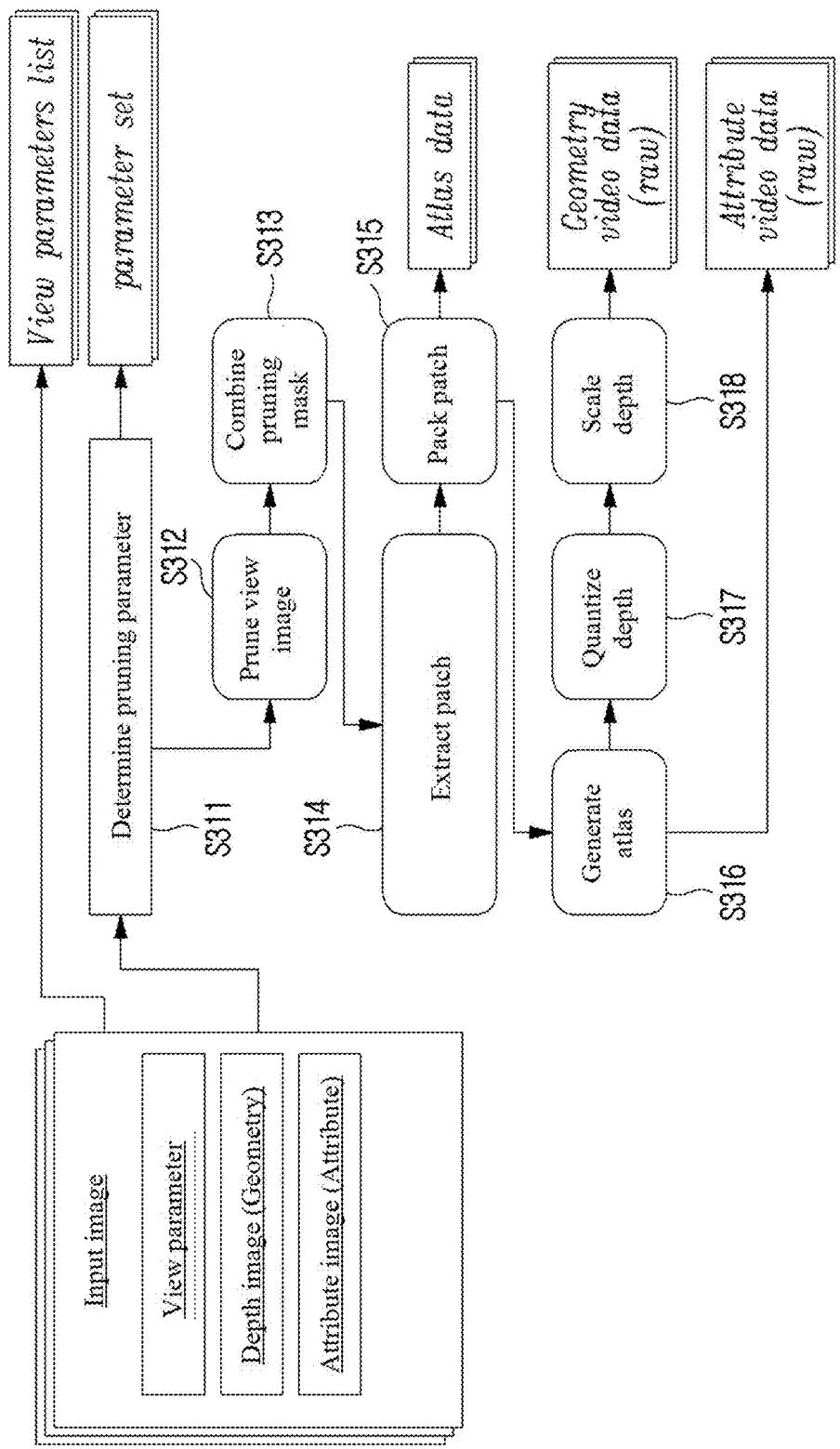

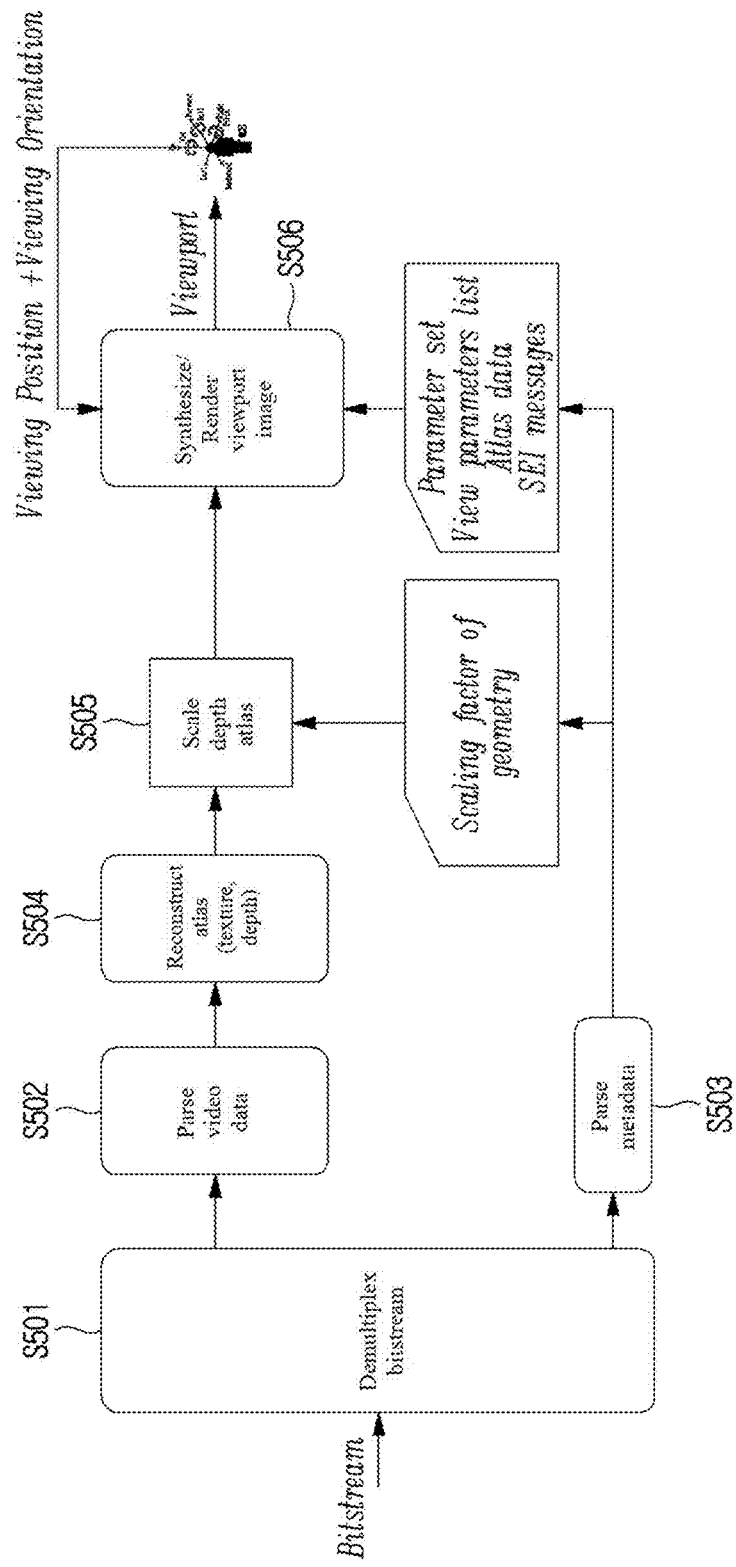
[FIG. 5]

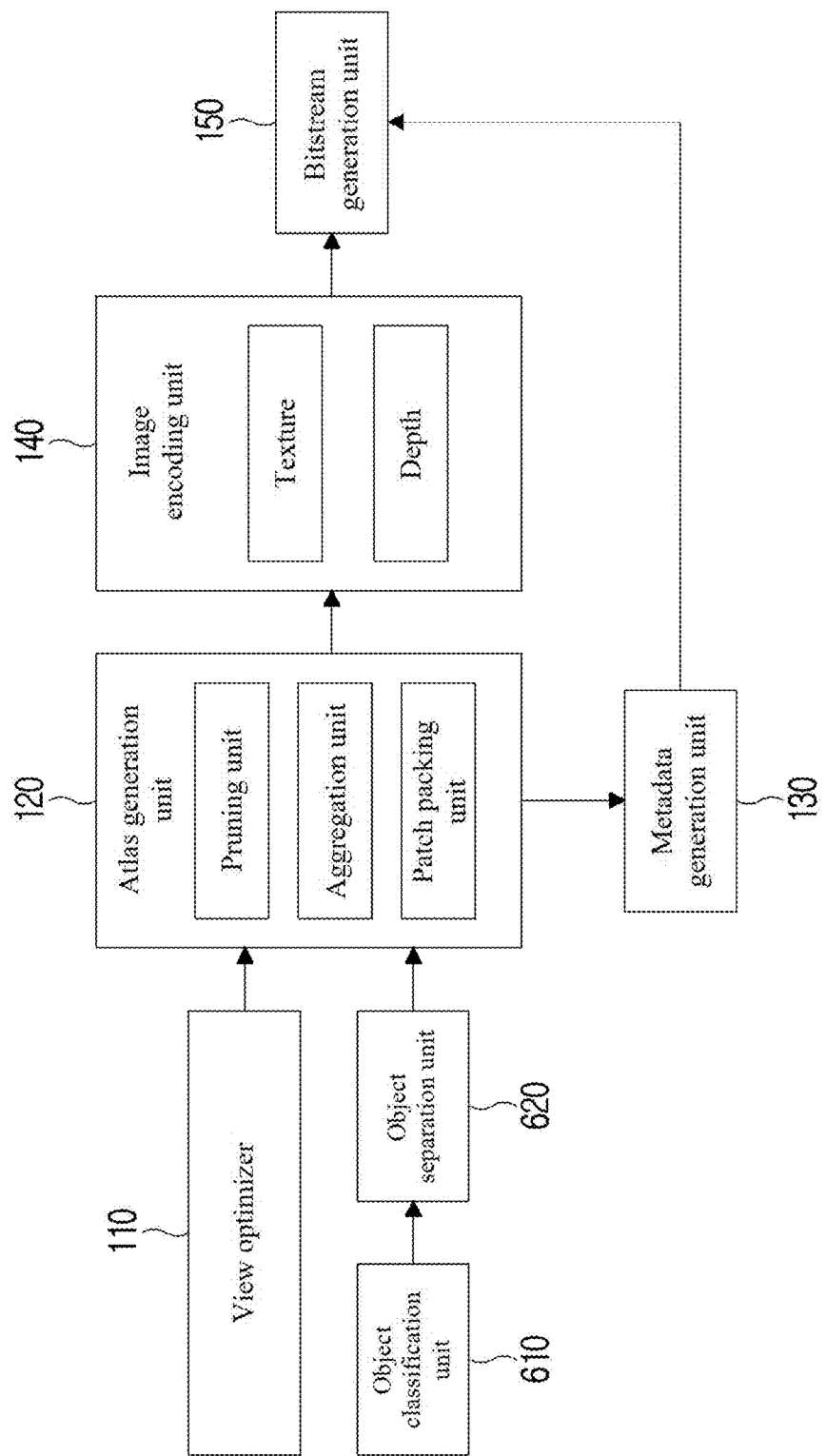
[FIG. 6]

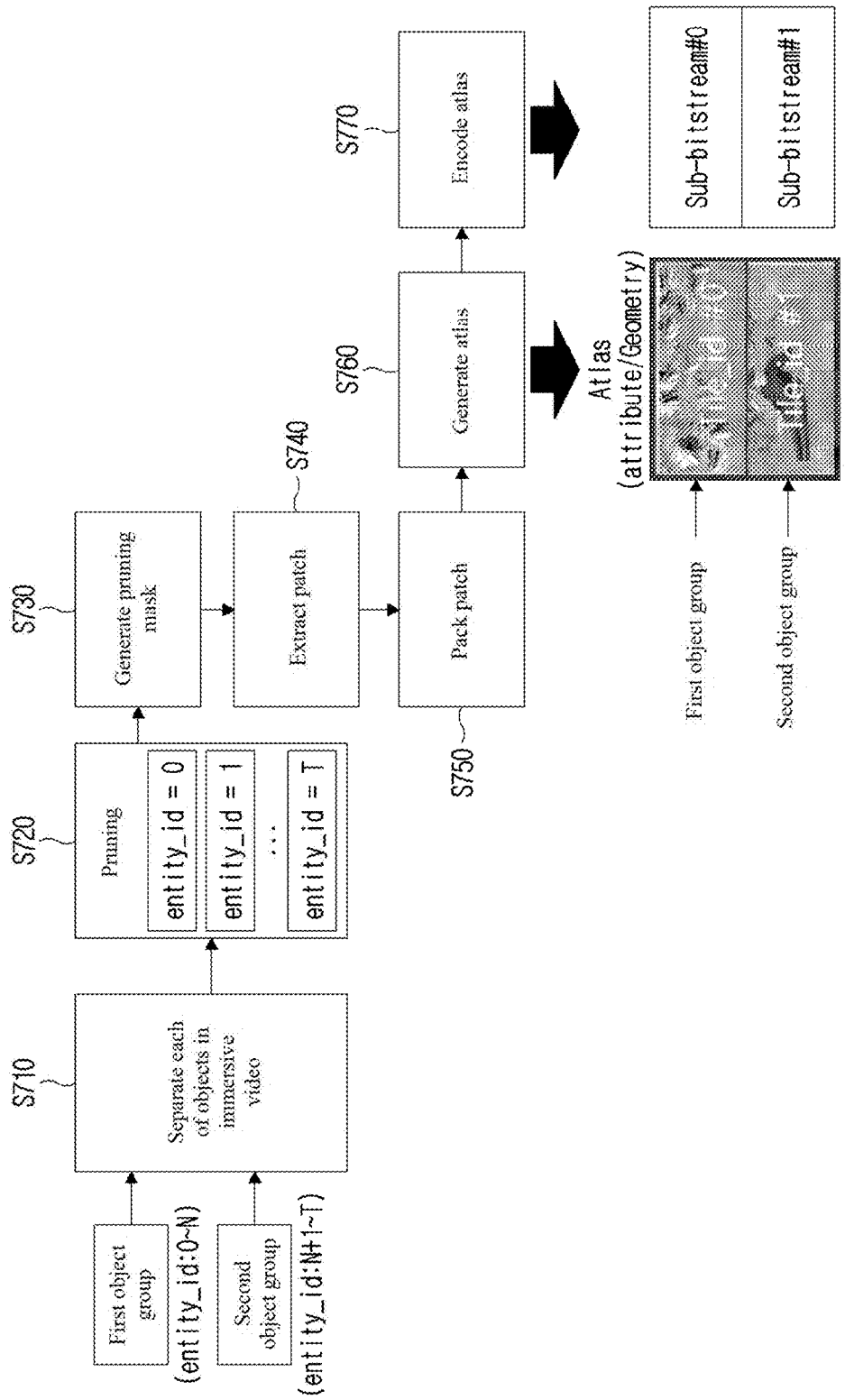
[FIG. 7]

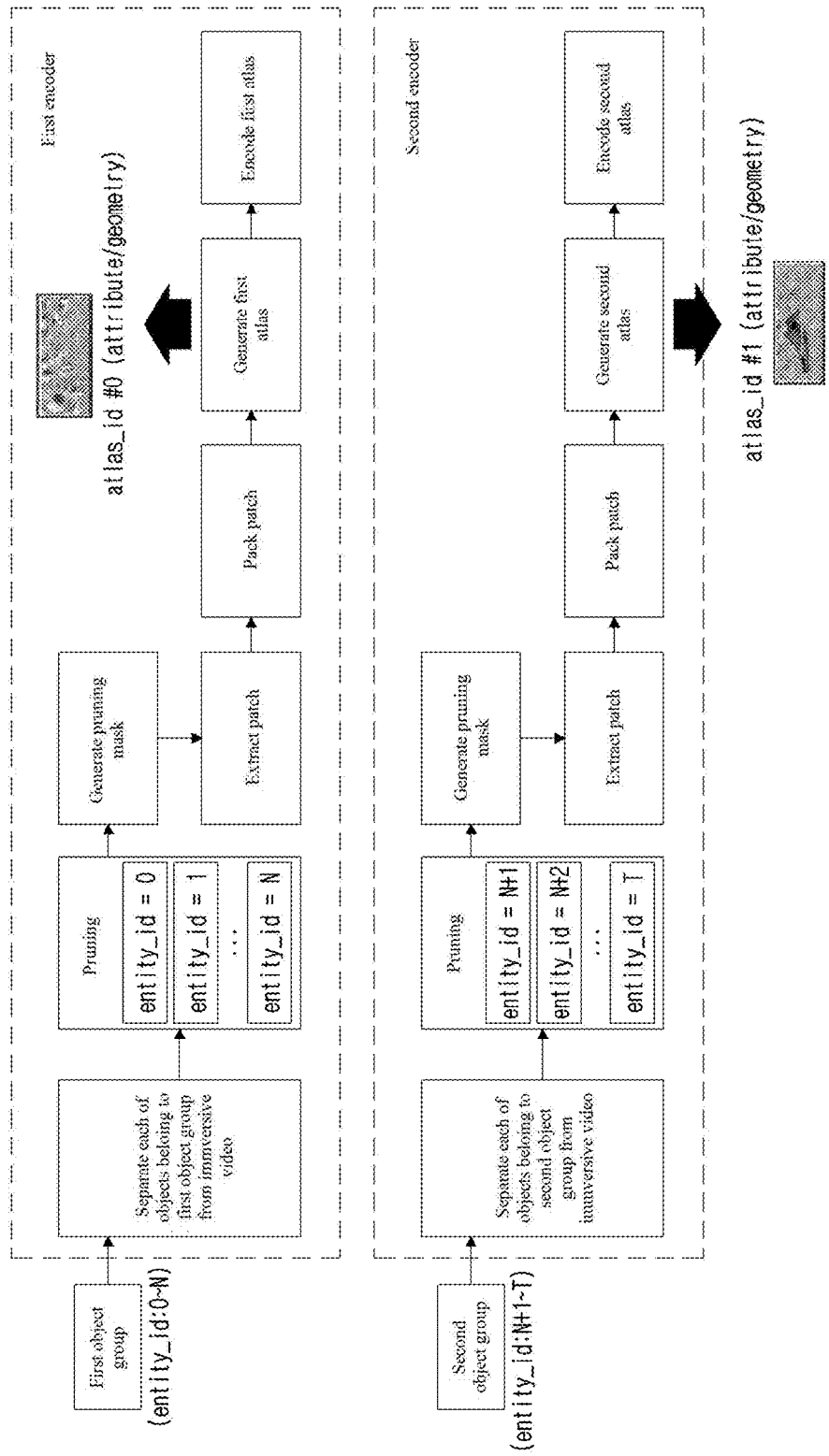
[FIG. 8]

[FIG. 10]

```
caf_miv_extension( ) {
    if( nal_unit_type == NAL_CAF_IDR ) {
        atlas_entity_mapping( )
        patch_entity_mapping( )
    } else {
        came_update_atlas_entity_mapping_flag
        came_update_patch_entity_mapping_flag if( came_update_atlas_entity_mapping_flag )
            atlas_entity_mapping( )
        if( came_update_patch_entity_mapping_flag )
            patch_entity_mapping ( )
    }
}
```

[FIG. 11]

```
atlas_entity_mapping( ) {
    aem_num_atlases_minus1
    aem_num_enities_minu1
    for( j = 0; j <= aem_num_atlases_minus1; j++ )
        atlasID =aem_atlas_id[ j ]
        for( e = 0; e <= aem_num_enities_minu1 ; e++ ) {
            aem_entity_id [ e ]
            aem_enitiy_enabled_in_atlas_flag[ atlasID ][ e ]
            if( aem_enitiy_enabled_in_atlas_flag[ atlasID ][ e ] ){
                aem_enity_complete_in_atlas_flag[ atlasID ][ e ]
                aem_enity_priorty[ atlasID ][ e ]
            }
        }
    }
}
```

[FIG. 12]
```
patch_entity_mapping( ) {
  pem_num_tiles_minus1
  for( i = 0; i <=pem_num_tiles_minus1; i++ ) {
    t = pem_tile_id[ i ]
    pem_num_patch_minus1[ t ]
    for( k = 0; k <=pem_num_patch_minus1[ t ] k++ ) {
      p= pem_patch_idx[t ][ k ]
      pem_entity_id[ p ]
      pem_enitiy_prioriy[ p ]
    }
  }
}
```
[FIG. 13]
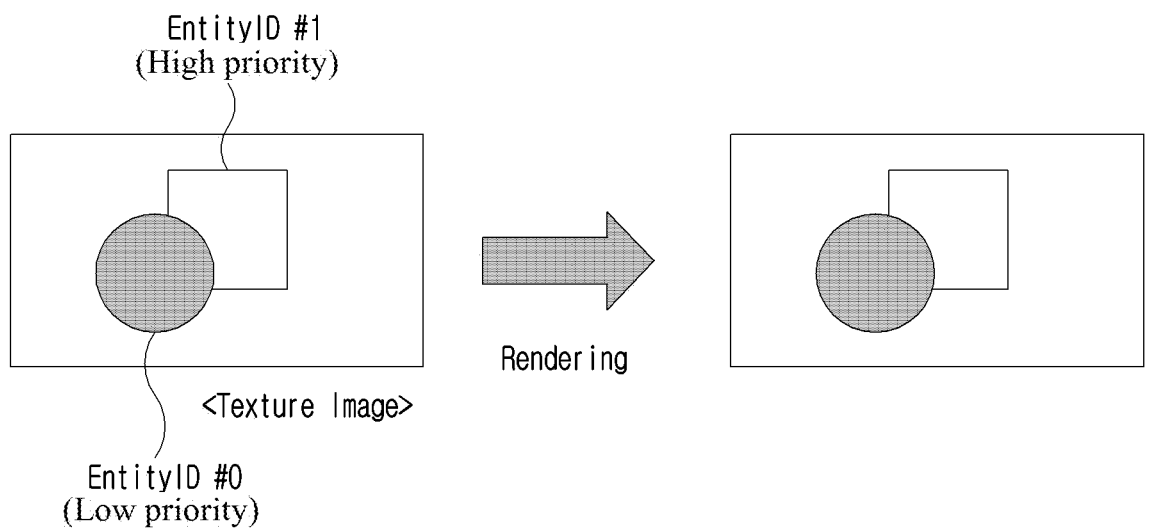

[FIG. 14]
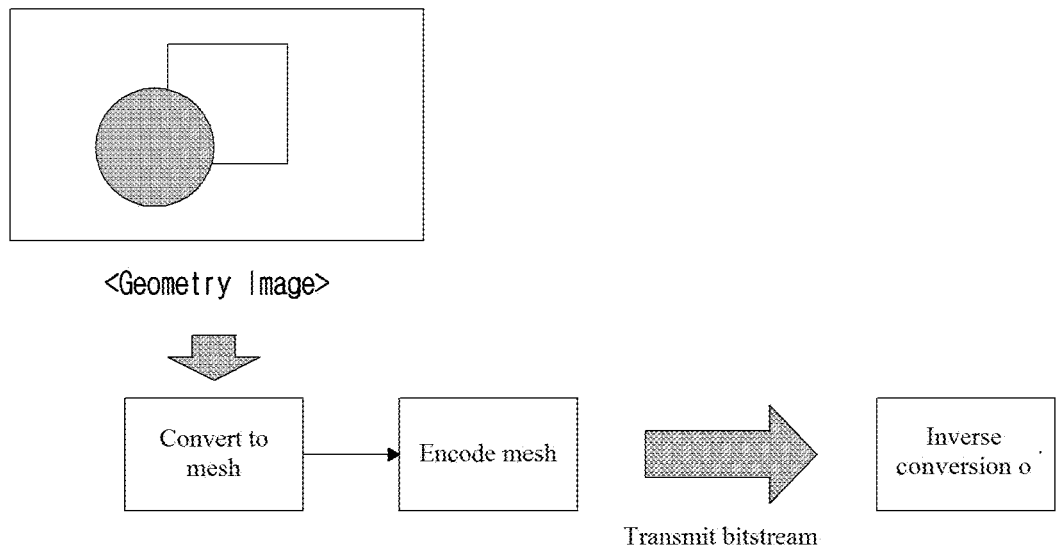
[FIG. 15]
| entity_group_mapping( ) { | Descriptor |
|---|---|
| egm_entity_group_count | u(4) |
| if( egm_entity_group_count > 0 ) | |
| for( e = 0; e <= aem_num_enities_minu1 ; e++ ) { | |
| k = aem_entity_id[ e ] | |
| egm_ entity_group_id[ k ] | u(v) |
| } | |

…

METHOD FOR DECODING IMMERSIVE VIDEO AND METHOD FOR ENCODING IMMERSIVE VIDEO

FIELD OF INVENTION

The present disclosure relates to a method for encoding/decoding an immersive video which supports motion parallax for a rotation and translation motion.

BACKGROUND OF THE INVENTION

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omni-directional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Problem

The present disclosure is to provide a method for packing patches in a unit of an object.

The present disclosure is to provide a method for packing patches in different regions or different atlases for each of object groups.

The present disclosure is to provide a method to designate a priority order for each of objects.

The technical objects to be achieved by the present disclosure are not limited to the above-described technical objects, and other technical objects which are not described herein will be clearly understood by those skilled in the pertinent art from the following description.

Technical Solution

In accordance with an aspect of the present invention, the above and other objects can be accomplished by the provision of a method of processing an immersive video, the method including classifying each of a plurality of objects included in a view image as one of a first object group and a second object group, acquiring a patch for each of the plurality of objects, and packing patches to generate at least one atlas. In this instance, patches derived from objects belonging to the first object group may be packed in a different region or a different atlas from a region or an atlas of patches derived from objects belonging to the second object group.

The patches derived from the objects belonging to the first object group may be packed in a first region in an atlas, and the patches derived from the objects belonging to the second object group may be packed in a second region in the atlas. In this instance, the first region and the second region may be allowed to be mutually independently encoded.

The first region and the second region may be different tiles, slices, or subpictures.

The patches derived from the objects belonging to the first object group may be packed in a first atlas, and the patches derived from the objects belonging to the second object group may be packed in a second atlas.

The first atlas and the second atlas may be repacked in a third atlas.

First syntax indicating whether information on a first object is included in a first atlas may be encoded in a bitstream.

When the information on the first object is included in the first atlas, second syntax indicating whether information sufficient to completely represent the first object is included in the first atlas may be further encoded in the bitstream.

When the information on the first object is included in the first atlas, third syntax indicating priority of the first object may be further encoded in the bitstream.

Patches extracted from an immersive video of a first type and patches extracted from an immersive video of a second type may be packed in different regions in the atlas or in different atlases, and information indicating a type of image from which patches packed for each atlas or packing region within the atlas are derived may be encoded.

The information may indicate one of an MIV type and a V-PCC type.

In accordance with another aspect of the present invention, there is provided a method of rendering an immersive video, the method including receiving a bitstream, decoding an atlas from the bitstream, and rendering a viewport image using the decoded atlas. In this instance, the bitstream may include first syntax indicating whether information on a first object is included in the atlas.

When the first syntax indicates that the information on the first object is included in the atlas, the bitstream may further include second syntax indicating whether information sufficient to completely represent the first object is included in the atlas.

When the first syntax indicates that the information on the first object is included in the atlas, the bitstream may further include third syntax indicating priority of the first object.

When the viewport image is rendered, arrangement positions of the first object and the second object in the viewport image may be determined based on priority of each of the first object and the second object.

In a case where the priority of the first object is higher than the priority of the second object, the first object may be disposed ahead of the second object when the viewport image is rendered, and in a case where the priority of the first object is lower than the priority of the second object, the second object may be disposed ahead of the first object when the viewport image is rendered.

Information indicating a type of image from which patches packed for each packing region within the atlas are derived may be encoded.

The information may indicate one of an MIV type and a V-PCC type.

When the viewport image is rendered, a weight of each of pixels for blending may be determined based on the priority of each of the first object and the second object.

The characteristics which are simply summarized above for the present disclosure are just an illustrative aspect of a detailed description of the after-described present disclosure and do not limit a range of the present disclosure.

Technical Effects

According to the present disclosure, a technical effect of encoding/decoding in a unit of an object can be provided by packing patches in a unit of an object.

According to the present disclosure, a technical effect of encoding/decoding a partial region of an atlas or a part of atlases can be provided by packing patches in different regions or different atlases for each of object groups.

According to the present disclosure, a quality of a viewport image can be improved by rendering the viewport image using a priority order of each object.

Effects achievable by the present disclosure are not limited to the above-described effects, and other effects which are not described herein may be clearly understood by those skilled in the pertinent art from the following description.

BRIEF DESCRIPTION OF DRAWINGS

FIG. 1 is a block diagram of an immersive video processing device according to an embodiment of the present disclosure.

FIG. 2 is a block diagram of an immersive video output device according to an embodiment of the present disclosure.

FIG. 3 is a flow chart of an immersive video processing method.

FIG. 4 is a flow chart of an atlas encoding process.

FIG. 5 is a flow chart of an immersive video output method.

FIG. 6 is a block diagram of an immersive video processing device that supports individual encoding of object groups.

FIG. 7 is a flowchart of a process of performing individual encoding of object groups based on the immersive video processing device of FIG. 6.

FIG. 8 is a diagram for describing a process in which generation and encoding of atlases are processed in parallel.

FIG. 10 illustrates a syntax structure including information related to object-based encoding.

FIG. 11 illustrates a syntax structure including connection information between an object and an atlas.

FIG. 12 is a diagram for describing an example in which rendering is performed in consideration of priorities of objects.

FIG. 13 illustrates an example of a new method of encoding/decoding geometric information of an object.

FIG. 14 illustrates a syntax structure including connection information between an object and a patch.

FIG. 15 illustrates a syntax structure including object group information.

DETAILED EMBODIMENTS

Figure 9:
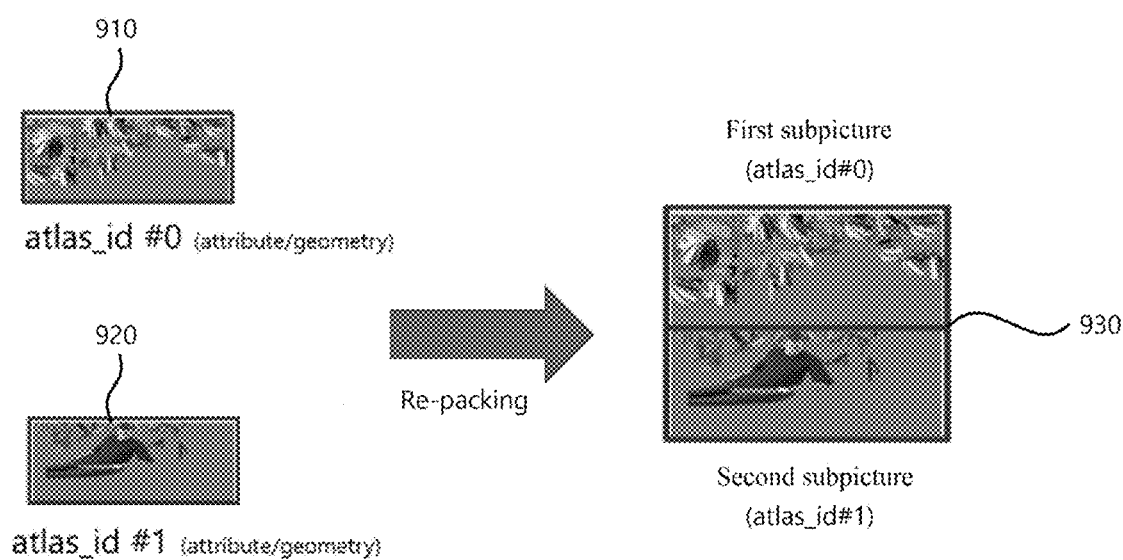
FIG. 9 illustrates an example in which a plurality of atlases is packed in one atlas.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's watching position is changed, refers to an image that a viewport may be also dynamically changed. In order to implement an immersive video, a plurality of input images are required. Each of a plurality of input images may be referred to as a source image or a view image. A different view index may be assigned to each view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, a depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

The immersive image processing device is for generating and encoding an atlas, and the immersive image processing device may be referred to as an encoder or an encoder side.

In reference to FIG. 1, an immersive video processing device according to the present disclosure may include a view optimizer 110, an atlas generation unit 120, a metadata generation unit 130, an video encoding unit 140 and a bitstream generation unit 150.

An immersive video processing device receives a plurality of pairs of images, a camera internal variable and a camera external variable as an input value to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera internal variable includes a focal distance, a position of a principal point, etc. and a camera external variable includes a position, a direction, etc. of a camera. A camera internal variable and a camera external variable may be treated as a camera parameter or a view parameter.

A view optimizer 110 partitions view images into a plurality of groups. As view images are partitioned into a plurality of groups, independent encoding processing per each group may be performed. In an example, view images filmed by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on a camera parameter. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image filmed by a camera with a highest priority, a view image filmed by a camera with a lowest priority, a view image filmed by a camera at a predefined position (e.g., a central position) or a view image filmed by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a squre valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a square image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

FIG. 2 is a block diagram of an immersive video output device according to an embodiment of the present disclosure.

The immersive video output device is for decoding an atlas and rendering a viewport image, and the immersive video output device may be referred to as a decoder or a decoder side.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be set.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an unpruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize generated patches, size/position information of each patch and a camera parameter, etc. may be used.

A unique identifier (entity_id) may be assigned to each of objects in an immersive video. Furthermore, objects in the immersive video may be classified into a plurality of groups, and each group may be individually encoded/decoded. The classification may be performed based on object properties. Here, the object properties may include at least one of a degree of movement of the object, a degree to which a reflective surface for light is distributed on the object, or complexity of a color and/or a depth value representing the object.

FIG. 6 is a block diagram of an immersive video processing device that supports individual encoding of object groups.

When compared to the immersive video processing device of FIG. 1, the immersive video processing device that supports individual encoding of object groups further includes an object classification unit 610 and an object separation unit 620.

The object classification unit 610 classifies the objects into a plurality of groups based on the object properties. A unique identifier (entity_group_id) may be assigned to each of the object groups.

The object separation unit 620 separates the immersive video in units of objects. Specifically, the object separation unit 620 may store each of the objects in the immersive video as an independent layer.

FIG. 7 is a flowchart of a process of performing individual encoding of the object groups based on the immersive video processing device of FIG. 6.

FIG. 7 illustrates that the objects are classified into two groups, that is, a first object group and a second object group. Specifically, in the illustration, objects having identifiers 0 to N are included in the first object group, and objects having identifiers (N+1) to T are included in the second object group.

In the immersive video processing device, the immersive video may be separated in units of objects (S710). Specifically, each of the objects in the immersive video may be designated as a different layer.

Thereafter, pruning may be performed in units of objects (S720). Specifically, pruning may be performed on each layer. In this instance, pruning may be performed based on pruning priorities among view images.

After performing pruning, a pruning mask is generated by merging pruning results (S730), and a patch is extracted using the pruning mask (S740).

An atlas image may be generated by packing extracted patches (S750). At this time, as in the example illustrated in FIG. 7, patch packing may be performed on an independent region for each patch group. That is, patches extracted from objects belonging to the second object group are not packed in a region in which patches extracted from objects belonging to the first object group are packed, and patches extracted from objects belonging to the first object group are not packed in a region in which patches extracted from objects belonging to the second object group are packed.

Here, the region may represent a region that may be coded/decoded independently of other regions. For example, the region may be one of a tile, a slice, and a subpicture. Here, the slice may include at least one tile. Alternatively, a plurality of slices may be generated by separating one tile. The subpicture may include at least one slice.

For example, as in the example illustrated in FIG. 7, patches extracted from objects belonging to the first object group may be packed in a first tile (Tile_id #0) in the atlas, and patches extracted from objects belonging to the second object group may be packed in a second tile (Tile_id #1) in the atlas. That is, patches generated from objects to which identifiers 0 to N are assigned may be packed in the first tile (Tile_id #0), while patches generated from objects to which identifiers (N+1) to T are assigned may be packed in the second tile (Tile_id #1).

Each of the regions may be encoded/decoded based on an AVC, HEVC, or VVC codec. Specifically, an encoding parameter may be independently defined for each region. For example, the VVC codec supports independent encoding/decoding technology capable of encoding/decoding tile regions or subpictures using different encoding parameters. Accordingly, the overall encoding/decoding efficiency may be improved by differently adjusting an encoding parameter such as a quantization parameter, a group-of-pictures (GOP) structure, or a frame rate of each of tiles or subpictures according to the object properties.

Unlike the example illustrated in FIG. 7, two or more atlases may be generated through patch packing. That is, when N object groups are present, a maximum of N atlases may be generated. By disposing encoders/decoders in parallel, a plurality of atlases may be encoded/decoded simultaneously.

FIG. 8 is a diagram for describing a process in which generation and encoding of atlases are processed in parallel.

For example, when a plurality of object groups is generated, patches extracted from objects belonging to a first object group among the plurality of object groups may be packed in a different atlas from that of patches extracted from objects belonging to a second object group. That is, patches extracted from objects belonging to the second object group are not packed in a first atlas in which patches extracted from objects belonging to the first object group are packed, and patches extracted from objects belonging to the first object group are not packed in a second atlas in which patches extracted from objects belonging to the second object group are packed.

FIG. 8 illustrates that two object groups are present, and patches of each of the two object groups are packed in different atlases. Specifically, patches extracted from objects belonging to the first object group are packed in the first atlas, while patches extracted from objects belonging to the second object group are packed in the second atlas.

As in the example illustrated in FIG. 8, atlases, the number of which is the same as the number of object groups, may be generated and encoded. Alternatively, atlases, the number of which is smaller than the number of object groups, may be generated. For example, patches derived from objects belonging to two of three object groups may be packed in a first atlas, while patches derived from objects belonging to the remaining object group may be packed in a second atlas.

Meanwhile, a step (S710) of separating each of the objects illustrated in FIGS. 7 and 8 may be a step of selectively operating according to the number of objects belonging to the immersive video. For example, in the example of FIG. 7, when the number of objects in the immersive video is set to 1 (for example, when a value of N or T−(N+1) is 1), the immersive video is processed according to an operation of the immersive video processing device illustrated in FIG. 2 without a process of separating the objects. That is, the entire immersive video is recognized as one object, and an augmented reality (AR) service of overlaying an object on a general video may be possible.

When the number of atlases is plural, a plurality of encoders/decoders is required to encode/decode the respective atlases. To reduce the number of encoders/decoders required, a plurality of atlases may be packed in one atlas. In this instance, each of the plurality of atlases may be independently defined as a region in which encoding/decoding may be performed.

FIG. 9 illustrates an example in which a plurality of atlases is packed in one atlas.

In the example illustrated in FIG. 9, two atlases are repacked to generate one atlas. At this time, each atlas may be repacked so as to be independently encoded/decoded. For example, in the example illustrated in FIG. 9, a first atlas (atlas_id #0) is set as a first subpicture in the repacked atlas, and a second atlas (atlas_id #1) is set as a second subpicture in the repacked atlas.

Through repacking, it is possible to reduce the number of atlases to be encoded/decoded, while facilitating temporal synchronization between view images. In addition, by packing the atlases in regions allowed to be independently encoded/decoded, it is possible to support encoding/decoding of the regions using different encoding parameters.

Meanwhile, an atlas may be generated based on an object extracted from a non-MIV-type immersive video such as a point cloud (for example, V-PCC or G-PCC) or a mesh. Here, an MIV-type immersive video represents several 360-degree omnidirectional images or multi-view images, and the non-MIV-type immersive video represents a volumetric video such as V-PCC or a mesh. The non-MIV-type immersive video may be referred to as heterogeneous content.

That is, an atlas may be generated based on objects extracted from the MIV-type video and an object extracted from the non-MIV-type immersive video.

In this instance, an object extracted from the non-MIV-type immersive video and an object extracted from the MIV-type immersive video may be allocated to different object groups. Accordingly, patches extracted from the non-MIV-type immersive video and patches extracted from the MIV-type immersive video may be packed in different regions in an atlas or in different atlases. Here, a packing region may be separated in units of tiles, slices, or subpictures.

Even when objects are not classified into a plurality of object groups, patches extracted from the non-MIV-type immersive video and patches extracted from the MIV-type immersive video may be packed in different regions in an atlas or in different atlases.

When an atlas including a patch extracted from the non-MIV-type immersive video is encoded, information representing a media type may be additionally encoded as metadata so that a decoder may operate according to a heterogeneous immersive video. Media type information may be an index indicating one of a plurality of video types. The plurality of video types may represent the MIV-type immersive video and the non-MIV-type immersive video.

As a specific example, the media type information may be information indicating whether the immersive video is an MIV-type immersive video or a V-PCC-type video. For example, a media type information value 0 may indicate an MIV-type immersive video, and a media type information value 1 may indicate V-PCC.

The media type information may be encoded and signaled in units of atlases or packing regions. For example, when patches extracted from the non-MIV-type immersive video are packed in a different tile from that of patches extracted from the MIV-type immersive video, the media type information may be signaled in units of tiles. For example, when a patch extracted from a general immersive video is packed in a tile having an identifier of 0 (that is, tile_id #0), a value of media type information media type for the tile having the identifier of 0 may be set to 0. On the other hand, when a patch extracted from a V-PCC immersive video is packed in a tile having an identifier of 1 (that is, tile_id #1), a value of media type information media type for the tile having the identifier of 0 may be set to 1.

As another example, when patches extracted from the non-MIV-type immersive video are packed in a different tile from that of patches extracted from the MIV-type immersive video, the media type information may be signaled in units of atlases. For example, when a patch extracted from the MIV-type immersive video is packed in an atlas having an identifier of 0 (that is, atlas_id #0), a value of media type information media_type for the atlas having the identifier of 0 may be set to 0. On the other hand, when a patch extracted from the V-PCC immersive video is packed in an atlas having an identifier of 1 (that is, atlas_id #1), a value of media type information media_type for the atlas having the identifier of 0 may be set to 1.

The media type information may be used to identify an immersive video from which an object is separated and an immersive video from which an object is not separated. For example, a value 0 of the media type information media_type indicates that patches extracted from an immersive video, from which an object is not separated, are packed. On the other hand, a value 1 of the media type information media type indicates that patches extracted from respective objects belonging to an immersive video are packed. Specifically, a value 0 of media type information media_type of a tile having an identifier of 0 indicates that patches generated by pruning an immersive video are packed in the tile having the identifier of 0. On the other hand, a value 1 of media type information media_type of a tile having an identifier of 1 indicates that patches generated by pruning respective objects belonging to an immersive video are packed in the tile having the identifier of 1.

Meanwhile, media type information may be coded and signaled through a syntax structure signaling information for each tile (for example, atlas_tile_data_unit( )) or a syntax structure signaling information for each atlas (for example, atlas_entity_mapping( )).

An encoder may encode information related to object (or object group)-based encoding as metadata, and signal the information to a decoder.

FIG. 10 illustrates a syntax structure including information related to object-based encoding.

A caf_miv_extension structure of FIG. 10 serves to describe metadata information commonly applied to atlases.

When object-based encoding is applied, connection information between an object and an atlas and connection information between an object and a patch may be encoded and signaled.

Connection information between an object and an atlas and connection information between an object and a patch may be encoded and signaled in an atlas_entity_mapping structure and a patch_entity_mapping structure, respectively.

Depending on time, information indicating whether the connection information is updated may be encoded and signaled. For example, even though connection information is set for each intra period, connection information may be updated within one intra period. For example, in the example illustrated in FIG. 10, when a current picture is an IDR picture (that is, when nal_unit_type is a NAL_CAF_IDR picture), the atlas_entity_mapping and patch_entity_mapping structures are called. However, when the current picture is not the IDR picture, whether to call the atlas_entity_mapping and patch_entity_mapping structures is determined through came_update_atlas_entity_mapping_flag and came_update_patch_entity_mapping_flag.

Specifically, a syntax came_update_atlas_entity_mapping_flag indicates whether connection information between an object and an atlas is updated. When came_update_atlas_entity_mapping_flag is 1, the atlas_entity_mapping structure in which connection information between an object and an atlas is defined is called, and the connection information between the object and the atlas is updated by a syntax element included in the structure. When came_update_atlas_entity_mapping_flag is 0, connection information between an object and an atlas of a previous picture is used without change.

The syntax came_update_patch_entity_mapping_flag indicates whether connection information between an object and a patch or between an object and a packing region is updated. Here, the packing region indicates a region in which a patch extracted from an object is packed, and may be a tile, a slice, or a subpicture. For convenience of description, in the present embodiment, it is assumed to be a packing region. When the syntax came_update_patch_entity_mapping_flag is 1, the patch_entity_mapping structure defining the connection information between the object and the patch is called, and the connection information between the object and the patch is updated by the syntax element included in the structure. When came_update_patch_entity_mapping_flag is 0, connection information between an object and a patch of a previous picture is used without change.

FIG. 11 illustrates a syntax structure including connection information between an object and an atlas.

The structure may include information indicating the number of atlases, the number of objects, and a mapping relationship between an atlas and an object.

For example, syntax aem_num_atlases_minus1 indicates the number of atlases. Syntax aem_num_enities_minu1 indicates the total number of objects.

FIG. 11 illustrates that a different atlas identifier (atlas_id) is assigned to each of atlases. That is, in the example illustrated in FIG. 11, the syntax aem_atlas_id[j] indicates an identifier assigned to a j-th atlas.

In addition, a different object identifier is assigned to each of objects. For example, syntax aem_entity_id[e] represents an identifier assigned to an e-th object.

Subsequently, whether information on a specific object is included in an atlas may be determined through syntax aem_entity_enabled_in_atlas_flag. For example, syntax aem_entity_enabled_in_atlas_flag[atlasID][e] indicates whether information on an object having an identifier of e (that is, a patch extracted from the object having the identifier of e) is included in an atlas having an identifier of atlasID.

A value 1 of the syntax aem_entity_enabled_in_atlas_flag[atlasID][e] indicates that the atlas having the identifier of atlasID includes information on the object having the identifier of e. In this case, syntax aem_entity_complete_in_atlas_flag[atlasID][e] may be additionally encoded and signaled. The syntax aem_entity_complete_in_atlas_flag[atlasID][e] indicates whether information capable of completely representing the object having the identifier of e is included in the atlas having the identifier of atlasID. When the syntax aem_entity_complete_in_atlas_flag[atlasID][e] is 1, the object having the identifier of e may be represented using only the atlas having identifier of atlasID.

A value 0 of the syntax aem_entity_enabled_in_atlas_flag[atlasID][e] indicates that the atlas having the identifier of atlasID does not include information on the object having the identifier of e.

Meanwhile, when a plurality of objects is present, information representing priorities among objects may be encoded and signaled. For example, when a plurality of objects is included in one atlas, at least one of arrangement or rendering order among objects may be determined in consideration of priorities among the objects.

For example, syntax aem_entity_priority[e] represents priority of the object having the identifier of e. As the object has higher priority, a smaller value may be assigned to the syntax aem_entity_priority. Alternatively, conversely, as the object has higher priority, a larger value may be assigned to the syntax aem_entity_priority.

FIG. 12 is a diagram for describing an example in which rendering is performed in consideration of priorities of objects.

When objects overlap in space, arrangement of the objects may be determined in consideration of priorities among the objects. For example, an object having higher object priority may be set to be positioned ahead of an object having lower priority in a depth direction. The above setting may be applied regardless of decoded depth values among objects.

For example, in the example illustrated in FIG. 12, even when a depth value of a second object (Entity_id #1) is smaller than a depth value of a first object (Entity_id #0), if priority of the second object designated by the syntax aem_entity_priority is higher than that of the first object, the second object may be positioned ahead of the first object in the depth direction.

Priorities among objects may be determined based on accuracy of spatial information (that is, geometry) for the objects. For example, high priority of an object means that accuracy of spatial information for the object is high. During rendering, an object, spatial information of which has high accuracy, may be rendered first.

In addition, during blending in which pixels are combined in the same space, weights of the respective objects may be adjusted based on the priorities among the objects. That is, a weight assigned to a pixel representing an object having high priority may have a higher value than that of a weight assigned to a pixel representing an object having low priority.

When objects are created in different environments, priorities may be assigned to objects during rendering according to quality, application purpose, etc., using the syntax aem_entity_priority. In addition, the number of priority steps may be adjusted by adjusting the number of bits allocated to the syntax aem_entity_priority. For example, priorities assigned to the respective objects may be set to different values. Alternatively, some objects may have the same priority.

An encoding/decoding method of geometry information (that is, geometry) of an object may be set differently from an encoding method of texture information.

FIG. 13 illustrates an example of a new method of encoding/decoding geometric information of an object.

For example, points in a 3D space in geometric information may be expressed as a triangular mesh, and the geometric information may be encoded using a mesh compression method. In this case, additional information expressible in a mesh may be easily encoded and signaled. Here, the additional information may include at least one of a reflection angle on an object surface or a material.

In this case, in the embodiments of FIGS. 6 to 8, a depth atlas may be in the form of a mesh rather than a 2D image. In addition, when the depth atlas is in the form of a mesh, information indicating that the depth atlas is in the form of a mesh may be encoded and signaled.

The decoder may receive and decode mesh-type information, and then inversely transform the decoded mesh into a 2D image form.

FIG. 14 illustrates a syntax structure including connection information between an object and a patch.

This structure may include information indicating the number of tiles in an atlas, the number of patches in a tile, and a mapping relationship between a patch and an object.

For example, syntax pem_num_tiles_minus1 represents a value obtained by subtracting 1 from the number of tiles in an atlas. Syntax pem_tile_id[i] represents an identifier assigned to an i-th tile.

Syntax pem_num_patch_minus1[t] represents a value obtained by subtracting 1 from the number of patches included in a tile having an identifier of t. Syntax pem_patch_idx[t][k] indicates an index assigned to a k-th patch included in the tile having the identifier of t.

An identifier pem_entity_id[p] represents an identifier of an object included in a patch having an index of p. That is, through the identifier pem_entity_id[p], it is possible to determine an object with which a patch included in an atlas is associated.

Meanwhile, information related to priority may be included in atlas_entity_mapping. For example, syntax pem_entity_priority[p] indicates priority of a patch to which an index p is assigned. Priorities among patches may be used to indicate at least one of rendering priority or accuracy of spatial information, similarly to the priorities among the objects described above.

FIG. 15 illustrates a syntax structure including object group information.

This structure may include information indicating the number of object groups, an identifier of an object group, and a mapping relationship between an object and an object group.

For example, syntax egm_entity_group count represents the number of object groups. Alternatively, unlike the illustrated example, syntax having a value derived by subtracting a predetermined value (for example, 1 or 2) from the number of object groups, for example, egm_eentity_group_count_minus1, may be encoded and signaled.

When the number of object groups is determined, an identifier of an object group and an object belonging to the object group may be indicated for each object group. For example, syntax aem_entity_id[e] indicates that an object having an identifier of e is included in a k-th object group.

In this instance, one object may be set to necessarily belong to one object group. Alternatively, some objects may be allowed to belong to a plurality of object groups according to an importance of each object.

Syntax egm_entity_group_id[k] represents an identifier assigned to the k-th object group. A unique identifier may be assigned to each of the object groups.

Meanwhile, information indicating a mapping relationship between an atlas and an object group may be encoded and signaled. For example, aem_entity_group_enabled_in_atlas_flag[atlasID][k] indicating a mapping relationship between an atlas and an object group may be encoded and signaled through the syntax structure illustrated in FIG. 11. The syntax may indicate whether information of an object group having an identifier of k is included in an atlas having an identifier of atlasID.

The syntax aem_entity_group_enabled_in_atlas_flag may be encoded/decoded instead of the syntax aem_entity_enabled_in_atlas_flag.

Alternatively, when the syntax aem_entity_group_enabled_in_atlas_flag[atlasID][k] is 1, each syntax aem_entity_enabled_in_atlas_flag may be encoded and signaled for each of objects belonging to the object group having the identifier of k.

A name of syntax elements introduced in the above-described embodiments is just temporarily given to describe embodiments according to the present disclosure. Syntax elements may be named differently from what was proposed in the present disclosure.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of processing an immersive image, the method comprising:
classifying each of a plurality of objects included in a view image into one of a first object group and a second object group;
obtaining first patches for the first object group and second patches for the second object group;
generating one or more atlases by packing the first patches and the second patches; and
encoding the one or more atlases,
wherein the first patches derived from the first object group are packed in a different region or a different atlas from the second patches derived from the second object group, and
wherein a first region or a first atlas in which the first patches are packed and a second region or a second atlas in which the second patches are packed are encoded independently of each other.

2. The method according to claim 1, wherein the region represents a tile, a slice, or a subpicture.

3. The method according to claim 1, wherein the first atlas and the second atlas are repacked in a third atlas, and
wherein the third atlas is encoded instead of separately encoding the first atlas and the second atlas.

4. The method according to claim 1, wherein a first syntax indicating whether information on a first object is included in an atlas is encoded in a bitstream.

5. The method according to claim 4, wherein, when the information on the first object is included in the first atlas, a second syntax, indicating whether the information included in the atlas is sufficient to completely represent the first object, is further encoded in the bitstream.

6. The method according to claim 4, wherein, when the information on the first object is included in the first atlas, a third syntax, which indicates priority of the first object, is further encoded in the bitstream.

7. The method according to claim 1, wherein the first object group comprises a first object included in
a first image of a first type and the second object group comprises a second object included in a second image of a second type,
wherein information indicating a type of an image from which patches are extracted is encoded for each of the first region and the second region, or for each of the first atlas and the second atlas.

8. The method according to claim 7, wherein the information indicates one of an MIV type and a V-PCC type.

9. The method according to claim 1, wherein identification information for identifying each of the first object group and the second object group is encoded into a bitstream.

10. A method of rendering an immersive image, the method comprising:
receiving a bitstream;
decoding one or more atlases from the bitstream; and
rendering a viewport image using the decoded one or more atlases,
wherein the first patches for the first object group are present in a different region or a different atlas from the second patches for the second object group, and
wherein a first region or a first atlas in which the first patches are present and a second region or a second atlas in which the second patches are present are decoded independently of each other.

11. The method according to claim 10, wherein a first syntax indicating whether information on a first object is present in an atlas is decoded from the bitstream, and
wherein, in response to the first syntax indicating that the information on the first object is present in the atlas, a second syntax indicating whether the information in the atlas is sufficient to completely represent the first object is further decoded from the bitstream.

12. The method according to claim 10, wherein, in response to the first syntax indicating that the information on the first object is present in the atlas, a third syntax indicating priority of the first object is further decoded from the bitstream.

13. The method according to claim 12, wherein arrangement order of the first object while rendering a viewport image is determined based on the priority of the first object.

14. The method according to claim 13, wherein
in a case where the priority of the first object is higher than a priority of a second object, the first object is disposed ahead of the second object while rendering the viewport image, and
wherein in a case where the priority of the first object is lower than the priority of the second object, the second object is disposed ahead of the first object while rendering the viewport image.

15. The method according to claim 10, wherein the first object group comprises a first object included in a first image of a first type and the second object group comprises a second object included in a second image of a second type, and
wherein information indicating a type of an image whether an object is derived from is decoded from the bitstream.

16. The method according to claim 15, wherein the information indicates one of an MIV type and a V-PCC type.

17. The method according to claim 14, wherein a weight of each of pixels for blending is determined based on the priority of each of the first object and the second object while rendering the viewport image.

18. A non-transitory computer-readable recording medium recording instructions when executed cause a processor or a computer to carry out a method of processing an immersive image, the method comprising:
classifying each of a plurality of objects included in a view image into one of a first object group and a second object group;
obtaining first patches for the first object group and second patches for the second object group;
generating one or more atlases by packing the first patches and the second patches, and
encoding the one or more atlases,
wherein the first patches derived from the first object group are packed in a different region or a different atlas from the second patches derived from the second object group, and
wherein a first region or a first atlas in which the first patches are packed and a second region or a second atlas in which the second patches are packed are encoded independently of each other.

* * * * *